INVENTOR.
Henry Konet
BY
Shenier & O'Connor
ATTORNEYS

United States Patent Office 3,547,503
Patented Dec. 15, 1970

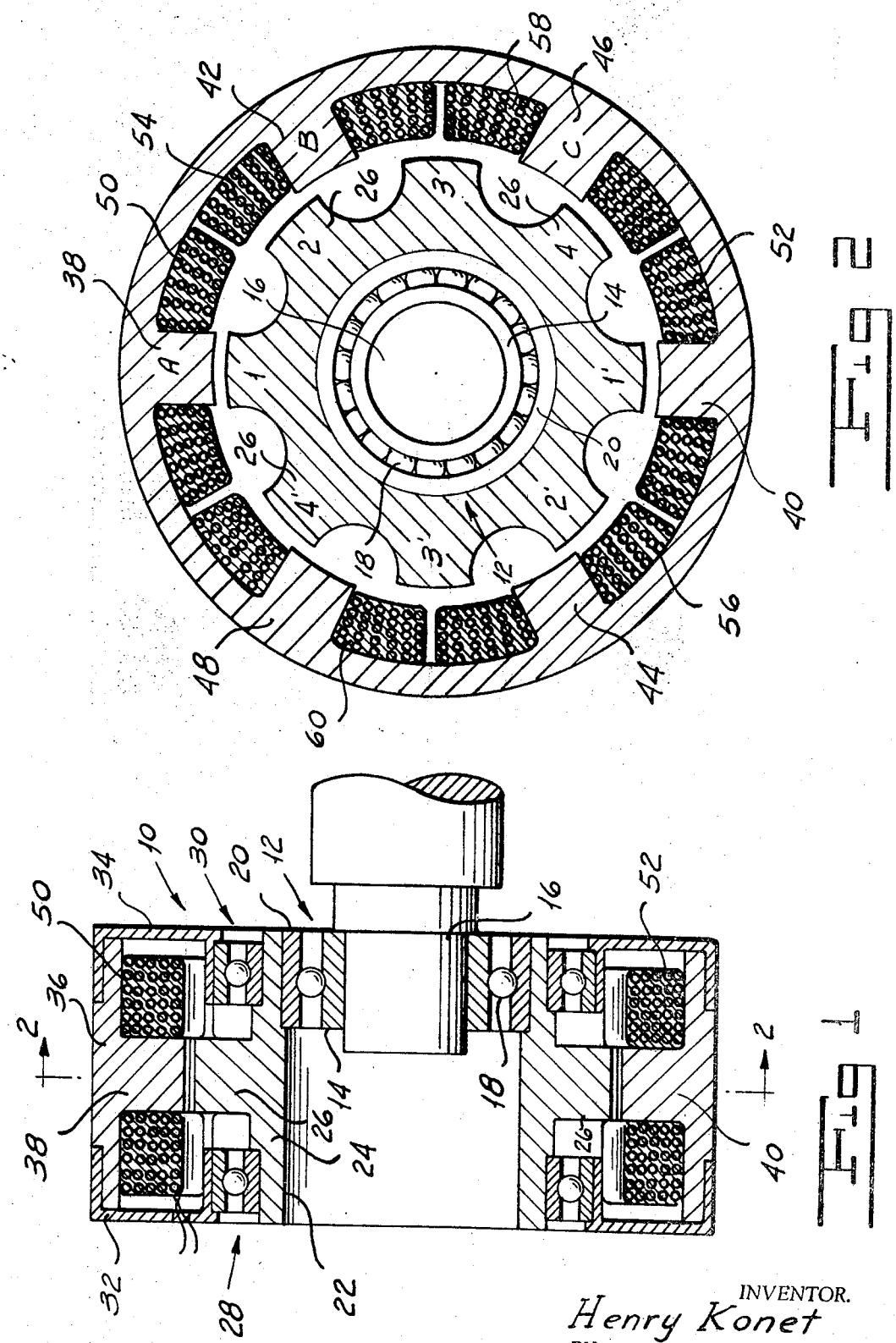

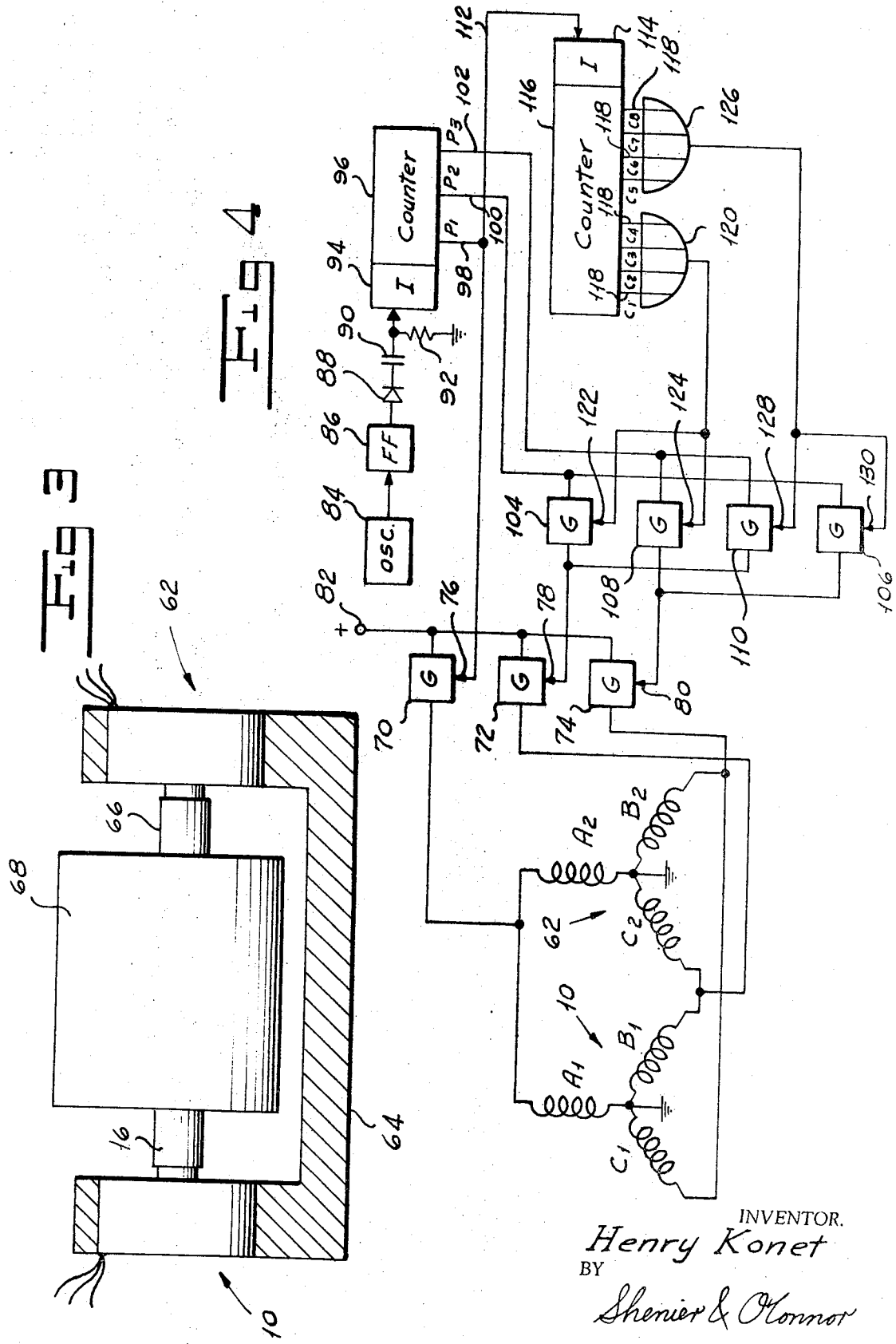

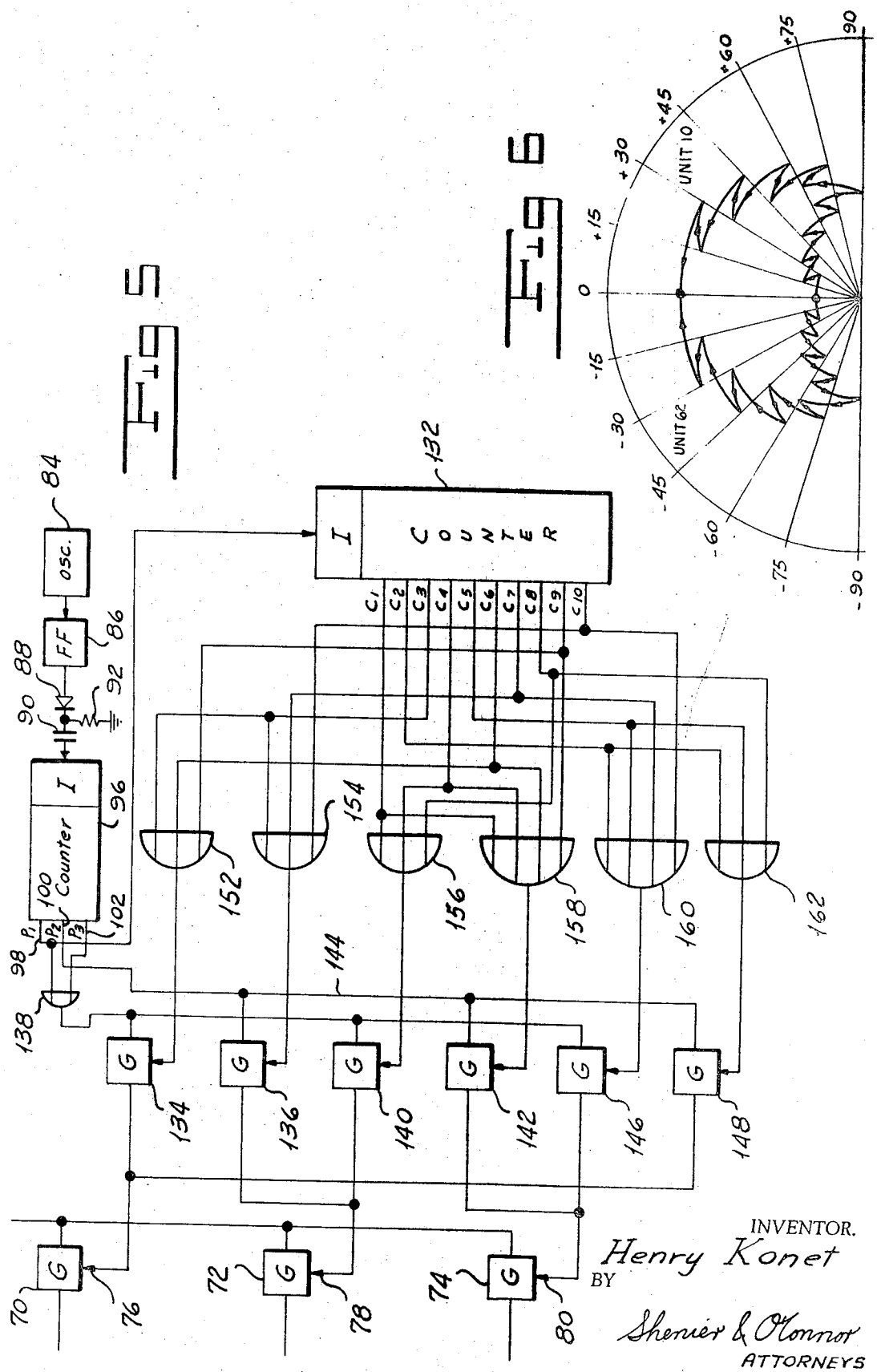

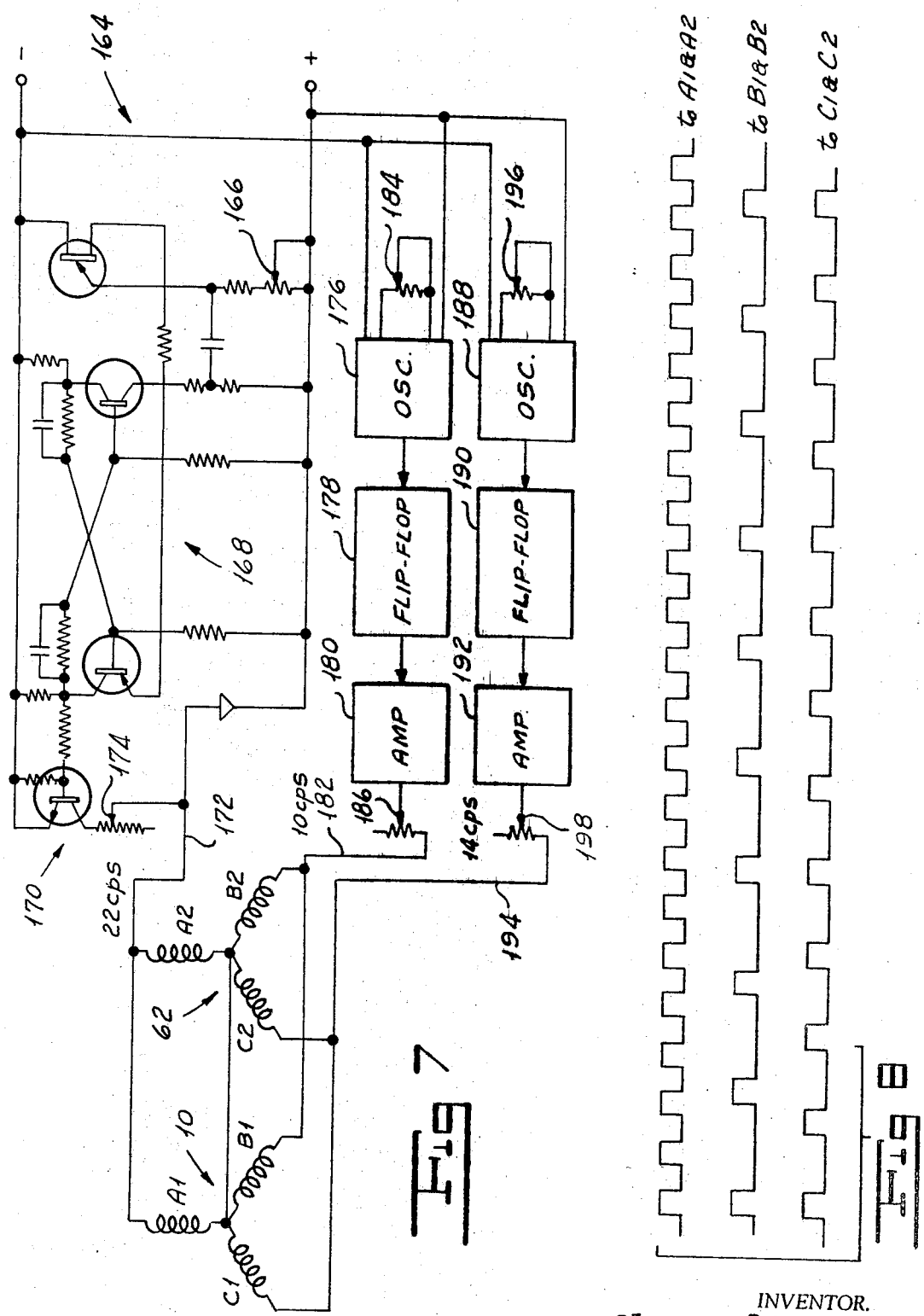

3,547,503
DUAL STEP MOTOR CONTROLLED LOW FRICTION OSCILLATING BEARING ARRANGEMENT FOR GYROSCOPE ROTOR OR THE LIKE
Henry Konet, Hohokus, N.J., assignor to The Barden Corporation, Danbury, Conn., a corporation of Connecticut
Filed June 11, 1968, Ser. No. 736,048
Int. Cl. F16c *39/00;* H02k *37/00, 1/46*
U.S. Cl. 308—183                                                8 Claims

ABSTRACT OF THE DISCLOSURE

A low friction bearing system for supporting a gyroscope rotor or the like for movement around an axis in which spaced outer bearing rings of bearing assemblies for supporting the shaft carry rotors of slow speed synchronous motors which are energized to drive the rings in opposite directions and to reverse the directions of movement of the rings after a predetermined rotation thereof while oscillating the rings during the predetermined rotation.

BACKGROUND OF THE INVENTION

Many attempts have been made in the prior art to reduce the effect of coulomb or static friction on rotatably sensitive elements. Various devices have been proposed for achieving this result. One such arrangement is illustrated in Mims et al. Patent No. 2,979,367, which discloses an arrangement of a permanent magnet and a winding supplied with alternating current for oscillating a rotatably supported element which carries the outer bearing ring of the bearing which supports the sensitive element. While this device effectively minimizes the average torque of the bearing, it requires a relatively high frequency operation. Moreover, it does not ensure that the net torque on the supported device will be minimized where the units are employed in pairs as is the case in almost all installations.

In other attempts to reduce the effect of static friction in the prior art, an intermediate rotatably supported element which carries the outer bearing ring has been continuously rotated by use of an external drive comprising a motor, gears and shafts. The obvious disadvantage of an arrangement of this type is the necessity for using an external motor and gears which occupy an excessive amount of space and which add inordinately to the weight of the installation.

SUMMARY OF THE INVENTION

I have invented an improved low friction bearing unit and system incorporating the same which overcomes the defects of arrangements of the prior art. My bearing unit is compact and is relatively light for the result achieved thereby. It does not employ a permanent magnet. My bearing unit is self-contained. My system effectively minimizes the net torque on the element being supported. My bearing unit does not require high frequency excitation.

One object of my invention is to provide an improved low friction bearing unit which is self-contained.

Another object of my invention is to provide an improved low friction bearing unit which is compact and light.

A further object of my invention is to provide a low friction bearing system which effectively minimizes the net torque on a supported element without necessitating the use of an external drive.

Still another object if my invention is to provide a self-contained low friction bearing unit which does not incorporate a permanent magnet.

Other and further objects of my invention will appear from the following description.

In general my invention contemplates the provision of a compact, self-contained, low friction bearing unit compising an integral slow-speed, synchronous motor disposed in a narrow, annular space surrounding the outer ring of a bearing. The motor rotor carrying the outer bearing ring has a number of teeth which differs from the number of multi-phase winding poles on the motor stator. In response to sequential energization of the stator winding phases, the rotor and outer ring carried thereby rotate at a slow speed.

I provide a system comprising a pair of my self-contained units disposed in spaced relationship for supporting an element for rotary movement. I so energize the stator windings of the two units as to minimize static friction while minimizing the net bearing torque applied to the supported element.

-BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of my improved low friction bearing unit.

FIG. 2 is a sectional view of my improved low friction bearing unit taken along the line 2—2 of FIG. 1.

FIG. 3 is a sectional view illustrating my system incorporating my low friction bearing unit.

FIG. 4 is a schematic view illustrating one driving arrangement for the system shown in FIG. 3.

FIG. 5 is a schematic view illustrating another driving arrangement for the system illustrated in FIG. 3.

FIG. 6 is a diagrammatic view illustrating the mode of operation of the system of FIG. 3 when driven in accordance with the showing of FIG. 4.

FIG. 7 is a schematic view illustrating an alternate driving arrangement for the system shown in FIG. 3.

FIG. 8 is a diagrammatic view showing the relationship among the trains of driving pulses for the system shown in FIG. 7.

DESCRIPTION OF THE PREFERRED EMBODIMENTS

Figure 9:
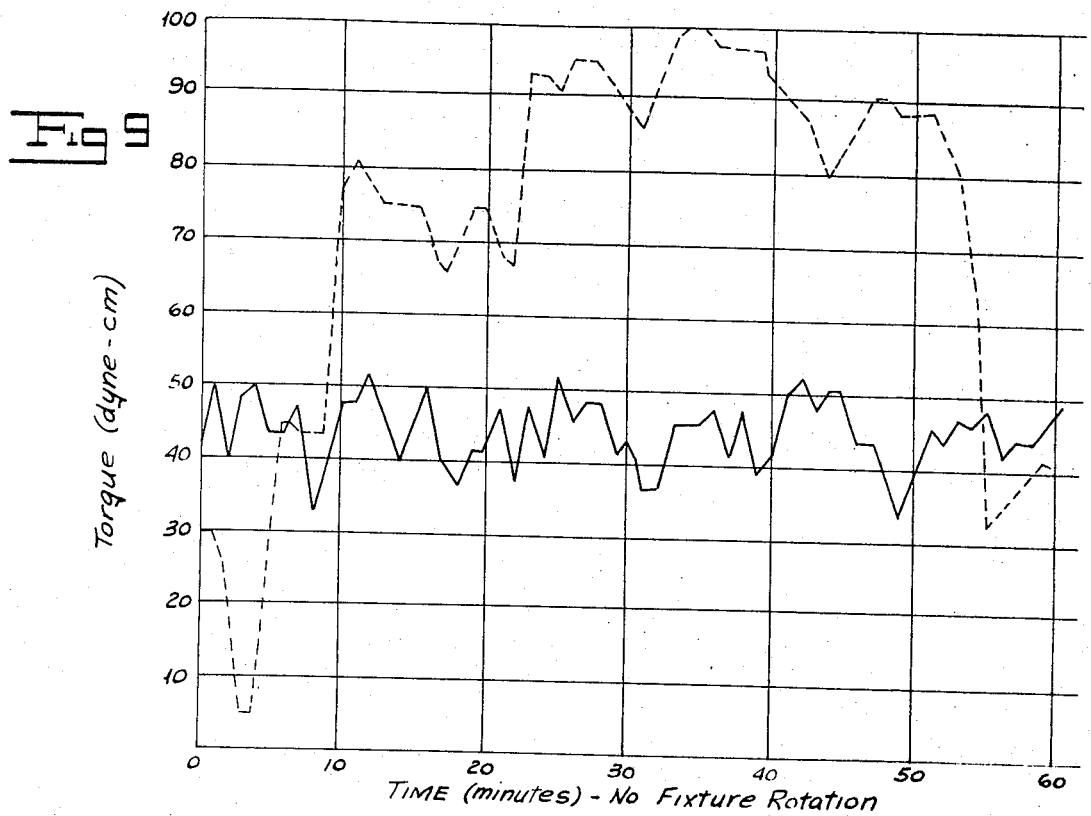
FIG. 9 is a graph illustrating the operational characteristics of the system shown in FIG. 7 under certain conditions.

Referring now to FIGS. 1 and 2 of the drawings, one of my bearing units, indicated generally by the reference character 10, comprises a principal bearing, indicated generally by the reference character 12, having an inner ring 14 supported on a shaft 16 for rotation therewith. Balls 18 are disposed between inner ring 14 and an outer ring 20. I mount the outer ring 20 of bearing 12 in a bore 22 of a rotor 24 by any suitable means known to the art.

Rotor 24 includes a plurality of integrally formed radially extending teeth 26 located intermediate the ends of the member 24. I provide respective spaced bearings indicated generally by the reference characters 28 and 30 for mounting the rotor 24 on respective end plates 32 and 34 carried by a stator 36. I provide the stator 36 with three respective pairs of poles 38 and 40, 42 and 44 and 46 and 48. I form the rotor 24 of magnetic material of low remanence. If the stator 36 has N salient poles then the rotor 24 has N±2 salient poles or teeth.

I mount respective pairs of coils 50 and 52, 54 and 56, and 58 and 60 on the pairs of poles 38 and 40, 42 and 44, and 46 and 48. The coils of each pair are connected to make up one phase of the stator winding. As will be explained more fully hereinbelow, when I sequentially energize the respective phases of my motor 10, the rotor 24 will move slowly in relatively small steps.

For purposes of exposition, I have designated the phase including coils 50 and 52 as phase A, the phase made up of coils 54 and 56 as phase B, and the phase including windings 58 and 60 as phase C. Moreover, the pairs of diametrically oppositely extending teeth 26 of the rotor 24 are identified as 1-1', 2-2', 3-3' and 4-4'. With the rotor 24 occupying the position shown in FIG. 2 if phase B is energized, the teeth 2-2' will align themselves with the poles 42 and 44 carrying the phase B winding. Owing to the fact that I provide three phases and four pairs of equally-spaced teeth 26, the rotor 24, in moving from the position of FIG. 2, to the position corresponding to energization of phase B, moves in a clockwise direction through 15 degrees. Now, if phase C is energized, the pair of teeth 3-3' line up with poles 46 and 48 of phase C. This stepwise movement of the rotor 24 will continue in response to sequential energization of the phases. As will be explained hereinbelow, we can change the order of energization of the phases to produce different types of rotary movement of rotor 24.

Referring now to FIG. 3 of the drawings I have shown a pair of my units indicated generally, respectively, by the reference characters 10 and 62. I mount the units 10 and 62 in spaced relationship on a frame 64 rotatably to support respective stub shafts 16 and 66 of a sensitive element such, for example, as a gyroscope rotor 68. As will be described hereinbelow, I so energize the respective units 10 and 62 as to minimize the effect of static friction while at the same time minimizing the net bearing torque applied to the supported element 68.

Referring now to FIG. 4 of the drawings, I have schematically indicated the three phases of the unit 10 as A1, B1 and C1. The phases of the unit 62 are designated as A2, B2 and C2. I so interconnect the phases of the two units 10 and 62 as to cause the rotor of unit 62 to move in the opposite direction as does the rotor of the unit 10. In the form of the drive shown in FIG. 4 respective gates 70, 72 and 74 are adapted to be rendered conductive in response to signals at their control terminals 76, 78 and 80 to couple a potential from a source terminal 82 to the various phases of devices 10 and 62. Gate 70 couples a potential to the A phases of both units. Gate 72 couples its signal to the B phase of unit 10 and to the C phase of unit 62. Gate 74 couples its signal to the C phase of unit 10 and to the B phase of unit 62.

An oscillator 84 drives a flip-flop 86, the output of which is applied by a diode 88 to a high-pass filter including a capacitor 90 and a resistor 92. I apply pulses appearing across the resistor 92 to the indexing section 94 of a counter 96 which may for example be a ring-of-three counter adapted to produce respective output pulses P1, P2 and P3 on its output channels 98, 100 and 102. I connect channel 98 carrying the P1 pulses to the control terminal 76 of gate 70. I provide the driving system of FIG. 4 with two pairs of gates 104 and 108 and 106 and 110 for reversing the application of pulses P2 and P3 to their associated phases when desired. I connect channel 100 to the input terminal of one gate of each of the pairs of reversing gates such, for example, as gates 104 and 106. Similarly, I connect channel 102 to the input terminals of the other gates 108 and 110 of the two pairs. Gates 104 and 110 are adapted to apply pulses to the terminal 78 of gate 72 while gates 106 and 108 are adapted to apply pulses to the terminal 80 of gate 74.

A channel 112 applies the P1 pulses to the indexing section 114 of a ring-of-eight counter 116 adapted to provide output pulses C1 to C8 on a plurality of output channels 118. A four-input OR circuit 120 applies the pulses C1 to C4 to the control input terminals 122 and 124 of gates 104 and 108. Similarly, a four-input OR circuit 126 applies pulses C5 to C8 to the control input terminals 128 and 130 of the gates 110 and 106.

From the structure thus far described and assuming that the rotors of both units 10 and 62 are in positions at which their teeth pairs 1-1' are aligned with the A1 and A2 phases and counter 96 puts out a pulse P1, counter 116 will put out a pulse C1 to render gates 104 and 108 conductive. The pulse P1 also couples the potential at terminal 82 to the phases A1 and A2. Considering the rotors 24 of both units 10 and 62 as starting from a position such as that illustrated in FIG. 2, this pulse P1 applied to windings A1 and A2 tends to hold the rotors in these positions. Upon the occurrence of the next pulse P2, gate 104 is conductive owing to the output C1 of counter 116. It applies pulse P2 to terminal 78 to cause gate 72 to conduct the potential to windings B1 and C2. With these phases energized, the pair 2-2' of teeth 26 on the rotor 24 of unit 10 align themselves with poles 42 and 44 to product a 15° clockwise step of movement of their rotor. At the same time the pair of teeth 4-4' of the rotor 24 of the unit 62 align themselves with poles 48 and 46 to produce a 15° counterclockwise movement of the rotor 24 of the unit 62.

When pulse P3 occurs, it passes through the conductive gate 108 to cause gate 74 to apply the potential to windings C1 and B2. This results in a further 15° step of movement of the rotor of unit 10 in a clockwise direction and of the rotor of unit 62 in a counterclockwise direction. The next pulse P1 operates counter 116 to render the channel C2 active. The rotors of the two units continue to step in opposite directions until they arrive at the 180° position. Then the next pulse P1 renders channel C5 conductive to activate gates 106 and 110 and the direction of stepwise movement of both rotors reverses. Again, when the rotors come back to their zero position, their motions are reversed.

It will thus be seen that each of the rotors rotates through 180° and then reverses and that the respective rotors move in opposite directions. Owing to this fact, static friction is minimized and substantially no net torque is applied to the supported device 68. For purposes of simplicity, I have outlined below in Table I the manner in which the various phases of the two devices are energized to provide the described motion.

TABLE I

| Counters | | Unit 10 | | Position | | Unit 62 | |
| --- | --- | --- | --- | --- | --- | --- | --- |
| 116 | 96 | Active phase | Aligned teeth | +° | −° | Active phase | Aligned teeth |
| C1 | P1 | A1 | 11' | 0 | 0 | A2 | 11' |
| C1 | P2 | B1 | 22' | 15 | 15 | C2 | 4'4 |
| C1 | P3 | C1 | 3'3 | 30 | 30 | B2 | 3'3 |
| C2 | P1 | A1 | 4'4 | 45 | 45 | A2 | 2'2 |
| C2 | P2 | B1 | 1'1 | 60 | 60 | C2 | 1'1 |
| C2 | P3 | C1 | 2'2 | 75 | 75 | B2 | 4'4 |
| C3 | P1 | A1 | 3'3 | 90 | 90 | A2 | 3'3 |
| C3 | P2 | B1 | 4'4 | 105 | 105 | C2 | 2'2 |
| C3 | P3 | C1 | 1'1 | 120 | 120 | B2 | 1'1 |
| C4 | P1 | A1 | 2'2 | 135 | 135 | A2 | 4'4 |
| C4 | P2 | B1 | 3'3 | 150 | 150 | C2 | 3'3 |
| C4 | P3 | C1 | 4'4 | 165 | 165 | B2 | 2'2 |
| C5 | P1 | A1 | 1'1 | 180 | 180 | A2 | 1'1 |
| C5 | P2 | C1 | 4'4 | 165 | 165 | B2 | 2'2 |
| C5 | P3 | B1 | 3'3 | 150 | 150 | C2 | 3'3 |
| C6 | P1 | A1 | 2'2 | 135 | 135 | A2 | 4'4 |
| C6 | P2 | C1 | 1'1 | 120 | 120 | B2 | 1'1 |
| C6 | P3 | B1 | 4'4 | 105 | 105 | C2 | 2'2 |
| C7 | P1 | A1 | 3'3 | 90 | 90 | A2 | 3'3 |
| C7 | P2 | C1 | 2'2 | 75 | 75 | B2 | 4'4 |
| C7 | P3 | B1 | 1'1 | 60 | 60 | C2 | 1'1 |
| C8 | P1 | A1 | 4'4 | 45 | 45 | A2 | 2'2 |
| C8 | P2 | C1 | 3'3 | 30 | 30 | C2 | 3'3 |
| C8 | P3 | B1 | 2'2 | 15 | 15 | B2 | 4'4 |

Referring now to FIGS. 5 and 6, I have shown an alternate drive system which illustrates another of the many possible ways in which the units 10 and 62 can be driven to minimize the effect of static friction. The form of my invention shown in FIG. 5 includes gates 70, 72 and 74 associated with the phases of the two units 10 and 62 in the same manner as in FIG. 4. It also includes the counter 96 and the asociated oscillator 84 for driving the counter to cause it to produce the pulses P1 to P3 on channels 98, 100 and 102. This form of my driving arrangement includes a ring-of-ten counter 132 indexed by the pulse P1 sequentially to activate output channels identified as C1 through C10.

A two-input OR circuit 138 couples the pulses P1 and P3 on channels 98 and 102 to a plurality of respective gating circuits 134, 140 and 146. A channel 144 couples the pulses P2 on channel 100 to respective gating circuits 136, 142 and 148. I connect the output terminals of gating circuits 134 and 148 to terminal 76, the output terminals of gates 136 and 140 to terminal 78 and the outputs of gates 142 and 146 to terminal 80.

A plurality of OR circuits 152, 154, 156, 158, 160 and 162 selectively connect the control channels C1 to C10 to the control terminals of gates 134, 136, 140, 142, 146 and 148 to cause the rotors of the respective units 10 and 62 to rotate in opposite directions while being oscillated with a reversal after a predetermined rotation thereof. By way of example, I have illustrated in FIG. 6 one pattern of motion produced by the arrangement of FIG. 5. For purposes of simplicity I have shown below in Table II the relationships between the pole pairs and teeth pairs of the two units 10 and 62 in response to the various control channels and actuating pulses.

TABLE II

| Counters | | Unit 10 | | Position | | Unit 64 | |
|---|---|---|---|---|---|---|---|
| 132 | 96 | Active phase | Aligned teeth | +° | −° | Active phase | Aligned teeth |
| C1 | P1 | B1 | 22' | 15 | 15 | C2 | 44' |
| C1 | P2 | C1 | 33' | 30 | 30 | B2 | 33' |
| C1 | P3 | B1 | 22' | 15 | 15 | C2 | 44' |
| C2 | P1 | C1 | 33' | 30 | 30 | B2 | 33' |
| C2 | P2 | A1 | 4'4 | 45 | 45 | C2 | 22' |
| C2 | P3 | C1 | 33' | 30 | 30 | B2 | 33' |
| C3 | P1 | A1 | 4'4 | 45 | 45 | A2 | 22' |
| C3 | P2 | B1 | 11' | 60 | 60 | C2 | 1'1 |
| C3 | P3 | A1 | 4'4 | 45 | 45 | B2 | 22' |
| C4 | P1 | B1 | 11' | 60 | 60 | C2 | 1'1 |
| C4 | P2 | C1 | 22' | 75 | 75 | B2 | 44' |
| C4 | P3 | B1 | 11' | 60 | 60 | C2 | 1'1 |
| C5 | P1 | C1 | 22' | 75 | 75 | B2 | 44' |
| C5 | P2 | A1 | 3'3 | 90 | 90 | A2 | 33' |
| C5 | P3 | C1 | 22' | 75 | 75 | B2 | 44' |
| C6 | P1 | A1 | 11' | 60 | 60 | A2 | 1'1 |
| C6 | P2 | C1 | 22' | 75 | 75 | B2 | 44' |
| C6 | P3 | A1 | 11' | 60 | 60 | A2 | 1'1 |
| C7 | P1 | C1 | 4'4 | 45 | 45 | B2 | 22' |
| C7 | P2 | B1 | 11' | 60 | 60 | C2 | 1'1 |
| C7 | P3 | C1 | 4'4 | 45 | 45 | B2 | 22' |
| C8 | P1 | B1 | 33' | 30 | 30 | C2 | 33' |
| C8 | P2 | A1 | 4'4 | 45 | 45 | A2 | 22' |
| C8 | P3 | B1 | 33' | 30 | 30 | C2 | 33' |
| C9 | P1 | A1 | 22' | 15 | 15 | A2 | 44' |
| C9 | P2 | C1 | 33' | 30 | 30 | B2 | 33' |
| C9 | P3 | A1 | 22' | 15 | 15 | A2 | 44' |
| C10 | P1 | C1 | 11' | 0 | 0 | B2 | 11' |
| C10 | P2 | B1 | 22' | 15 | 15 | C2 | 44' |
| C10 | P3 | C1 | 11' | 0 | 0 | B2 | 11' |

From the table it will be seen that with the rotors of both units in the zero position, when a pulse P1 appears so as to produce a signal on channel C1, both gate 140 and gate 142 are active. Pulse P1 passes through gate 140 to phases B1 and C2 to produce a 15° clockwise step of the rotor of unit 10 and to produce a 15° counterclockwise step of rotation of the rotor of unit 62. When pulse P2 appears it passes through gate 142 to render gate 74 conductive to energize phases C1 and B2 to cause the rotor of unit 10 to move to the +30° position and to cause the rotor of unit 62 to move to the −30° position. When pulse P3 appears it goes through the same gate 140 as that through which pulse P1 moved to return the rotors to the 15° positions.

The next pulse P1 activates channel C2 to render gates 146 and 148 conductive through circuits 160 and 162. Pulse P1 renders gate 74 conductive to energize phases C1 and B2 again to move the rotors to the 30° positions. Pulse P2 however passes through gate 148 to render gate 70 conductive to energize phases A1 and A2 to cause both units to step to the 45° position. P3 of this group goes through gate 146 again to energize phases C1 and B2 to return the rotors to the 30° position.

The operation described above continues until upon the occurrence of a pulse P2 with channel C5 active, the rotors arrive at their 90° positions. At this point, as can be seen from the table, the direction of overall rotation reverses and the rotors move back to their original positions and oscillate as they so move.

While I have described two driving arrangements, one of which provides continuous stepwise rotation of the two rotors in different directions with a reversal after a predetermined rotation and the other of which provides a similar motion but with an oscillation during the rotary movement, it will readily be appreciated that I may achieve an extremely wide range of variations in the movements of the rotors as these become necessary to overcome the effect of static friction.

Referring now to FIGS. 7 and 8, I have shown another driving arrangement for the system illustrated in FIG. 3. This system differs from that illustrated in FIG. 4 in that I connect windings A1 and A2, B1 and B2 and C1 and C2 rather than A1 and A2, B1 and C2 and B2 and C1 as shown in FIG. 4. In addition, in the arrangement illustrated in FIG. 7, I generate a plurality of trains of pulses at different respective frequencies and apply the trains to the connected sets of windings of the two units 10 and 62. An oscillator, indicated generally by the reference character 164, provides an output signal at a frequency determined by the setting of the brush 166 of an adjustable resistance. The output of the oscillator 164 drives a flip-flop, indicated generally by the reference character 168, to generate a train of pulses which are amplified in an amplifier, indicated generally by the reference character 170 and then are applied by a conductor 172 to the A1 and A2 windings. A brush 174 permits the amplitude of the signal applied to windings A1 and A2 to be adjusted. Since the further details of the oscillator 164, flip-flop 168, and amplifier 170 do not, per se, form part of my invention, they will not be described. As indicated by the blocks 176, 178 and 180, I provide an oscillator, a flip-flop and an amplifier for providing a train of pulses which are applied to the B1 and B2 windings by means of a channel 182. A brush 184 permits the frequency generated by the oscillator 176 to be varied while a brush 186 permits the amplitude of the signal output from amplifier 180 to be varied.

An oscillator 188, a flip-flop 190 and an amplifier 192 provide a third train of pulses which are fed to the windings C1 and C2 by a channel 194. A brush 196 permits the frequency of the output of oscillator 188 to be varied while a brush 198 permits the amplitude of the signal output of amplifier 192 to be varied.

I have discovered that where trains of pulses of different respective frequencies are applied to the windings of the units 10 and 62 in the manner shown in FIG. 7, a random motion of the rotors 24 of the two units results. This random motion, moreover, provides greatly improved operation of the bearings 12 of the units. By adjusting the frequencies of the oscillators 164, 176 and 188, the operating characteristics can be optimized. By way of example, in one setup which was employed to determine the operating characteristics of the system described, a body simulating the body 68 was supported on a pair of units, such as the units 10 and 62, and the supply frequencies of the respective oscillators of the arrangement shown in FIG. 7 were adjusted until they had respective frequencies of 22 c.p.s., 10 c.p.s. and 14 c.p.s. By way of illustration in FIG. 8 I have shown the relationship among the various trains of pulses at these frequencies. An examination of the figure reveals that under these conditions of energization of the windings of the units, the resultant motion of the rotors 24 will be highly random. My tests further reveal that this random motion provides improved operating characteristics over that which results from a fixed oscillation of the rotor 24.

Figure 10:
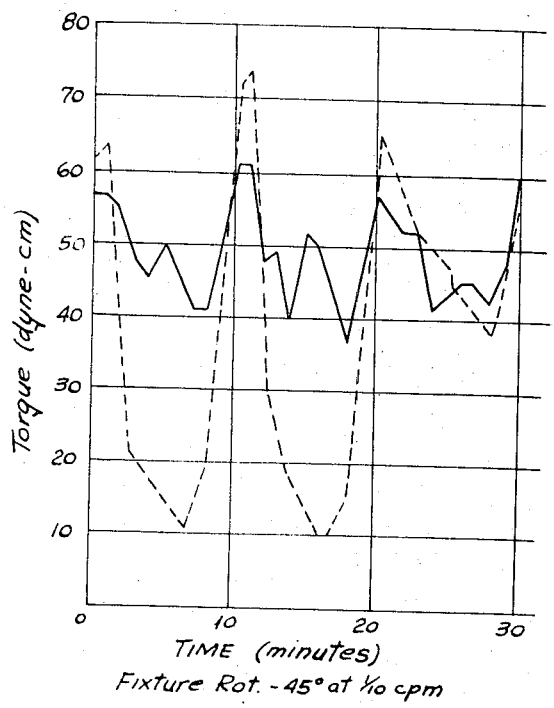
FIG. 10 is a graph illustrating an operational characteristic of the arrangement shown in FIG 7 under another condition of operation.
Figure 11:
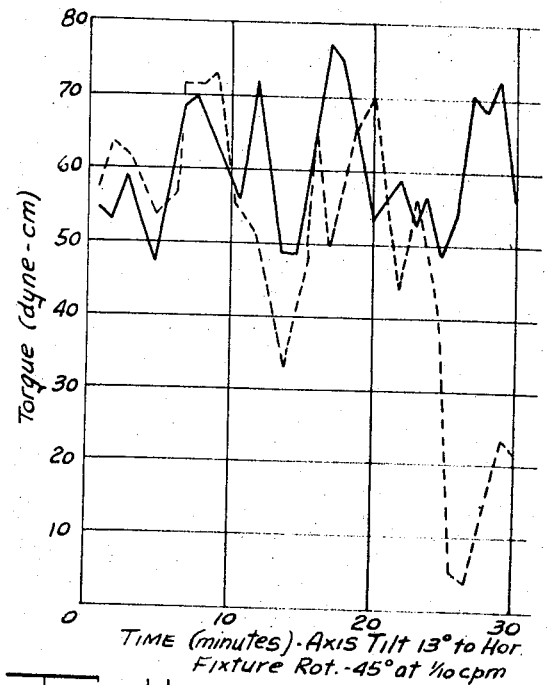
FIG. 11 is a graph illustrating an operational characteristic of the system shown in FIG. 7 under another condition of operation.

FIGS. 9 to 11 represent the results of actual tests which were made in measuring the torque on the shaft which supported the body simulating the body 68. In the first test, the results of which are illustrated in FIG. 9, no rotation was imparted to the fixture or frame 64 carrying the bearings. The result of the test with a fixed oscillation is shown in broken lines in the figure, while the test employing the random oscillation as in the arrangement shown in FIG. 7 is illustrated in full lines. I discovered, as is indicated by the graph, that random oscillation of the rotors 24 of the units offered a significant reduction of torque uncertainty as compared to fixed oscillation.

In making the test illustrated in FIG. 10, the fixture or frame 64 was caused to rotate through 45° of arc at a speed of about $\frac{1}{10}$ of a cycle per minute to simulate the motion of gimbal support. Under these conditions, as shown in FIG. 10, the torque variation with random oscillation was much less than the torque variation when the oscillation was fixed. In yet another test, as illustrated in FIG. 11, the axis of the system was tilted at an angle of 13° to the horizontal and the frame again was rotated through an arc of 45° at about $\frac{1}{10}$ of a cycle per minute. Again, under these conditions of test, the torque variation with random oscillation was considerably less than that which occurred when fixed oscillation was employed. It is to be understood that in all the tests shown in FIGS. 9 to 11, the zero point of torque is entirely arbitrary since I desired only to determine what was the variation in torque. It was clear from the tests which were made that random motion or oscillation of the rotors 24 provided much less variation in torque than that which resulted where the oscillation was fixed.

In operation of one of the motors of my self-contained bearing unit, such as the unit 10, in response to successive energization of the phases thereof, the rotor 24 will move stepwise at a relatively slow speed in the direction of the successive energization of the phases. In an installation of two of my units 10 and 62, such as is shown in FIG. 3, I may drive the units to produce any desired movements thereof. Preferably I arrange the drive to produce the minimum net torque on the supported device 68 while at the same time minimizing the effect of static friction. Where I employ the arrangement shown in FIG. 4, the two rotors will move stepwise in opposite directions through any desired degree of rotation and then they may be reversed. Alternatively, if I so desire, I may oscillate the respective rotors as they rotate in opposite directions and, if desired, I may provide a reversal of the direction of overall rotation. I have discovered also that use of the random system illustrated in FIG. 7 for energizing the units results in much less torque variation than that which is present when the units are driven to provide a fixed oscillation of the rotors.

It will be seen that I have accomplished the objects of my invention. I have invented an improved low friction bearing unit which is self-contained, compact and light. My bearing system minimizes the net torque applied to the supported element. My bearing incorporates no permanent magnet. It is versatile in that it may be driven with almost any desired motion. It does not require high frequency excitation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A low friction bearing system for supporting a sensitive member for rotary movement around an axis including in combination, a pair of bearings each comprising an inner ring and an outer ring and rolling elements disposed between said rings, a pair of slow speed synchronous motors each having a rotor carried by a respective one of said outer rings and means for randomly energizing said motors to drive said outer rings with a random motion.

2. A low friction bearing system as in claim 1 in which said energizing means comprises means for generating trains of pulses at various respective frequencies.

3. A low friction bearing system as in claim 1 in which each of said motors comprises a stator winding having a plurality of space phase displaced windings, said energizing means comprising means for generating trains of pulses at various respective frequencies and means for applying the trains of pulses respectively to the windings of each of said stators.

4. A low friction bearing system as in claim 1 in which said stator is formed with N salient poles, and in which said rotor is formed with $N\pm2$ salient poles, respective windings carried by said stator poles, said energizing means comprising means for generating trains of pulses at various respective frequencies and means for applying the trains of pulses respectively to the windings of each of said motors.

5. In a low friction bearing system a slow speed synchronous motor having a stator provided with a plurality of space phase displaced windings, means for generating a plurality of trains of pulses of various respective frequencies and means for applying the trains of pulses respectively to the windings of said motor.

6. In a low friction bearing system as in claim 5 in which said stator is formed with N salient poles carrying said windings and in which said rotor has $N\pm2$ salient poles.

7. A self-contained low friction bearing including in combination, an inner ring having a raceway, an outer ring having a raceway, rolling elements between the rings in said raceways, a synchronous motor having a rotor and a stator, said stator being provided with a plurality of space-phase displaced windings, said rotor mounted on said outer ring for rotation therewith, said stator being disposed radially outward of said rotor, and means for energizing said stator windings to drive said rotor, said energizing means including means for reversing the direction of movement of said rotor after a predetermined rotation thereof and means for oscillating said rotor during said predetermined rotation.

8. A low friction bearing system for supporting a sensitive member for rotary movement around an axis including in combination, a pair of self-contained bearing units, each comprising an inner ring and an outer ring and rolling elements disposed between said rings and a slow speed synchronous motor having a rotor carried by the outer ring for movement therewith and means for energizing said motors to drive said rings in opposite directions, said energizing means comprising means for reversing the directions of movement of said rotors after a predetermined rotation thereof and means for oscillating said rotors during said predetermined rotation.

References Cited

UNITED STATES PATENTS

| | | | |
|---|---|---|---|
| 3,336,810 | 8/1967 | Schaffer et al. | 74—5 |
| 2,518,159 | 8/1950 | Martin | 308—183 |
| 2,979,367 | 4/1961 | Mims et al. | 308—183 |
| 3,024,399 | 3/1962 | Valentino | 318—283 |
| 3,225,606 | 12/1965 | Stiles | 74—5 |
| 3,268,785 | 8/1966 | Gerber et al. | 318—8 |
| 3,381,193 | 4/1968 | Smith | 318—138 |
| 3,401,322 | 9/1968 | O'Regan | 318—138 |
| 3,412,302 | 11/1968 | Vercellott | 318—138 |
| 3,416,054 | 12/1968 | Galles | 318—138 |

WARREN E. RAY, Primary Examiner

U.S. Cl. X.R.

74—5; 310—36, 49, 90, 114; 318—138